May 12, 1970  J. MÜLLER  3,511,129

MILLING AND DRILLING TOOL

Filed March 20, 1968  3 Sheets-Sheet 1

INVENTOR
JOHANN MÜLLER
BY Brady, O'Boyle & Gates
ATTORNEYS

United States Patent Office 3,511,129
Patented May 12, 1970

3,511,129
MILLING AND DRILLING TOOL
Johann Müller, Munich, Germany, assignor to Friedrich Deckel Prazisions Mechanik & Maschinenbau, Munich, Germany, a firm of Germany
Filed Mar. 20, 1968, Ser. No. 714,499
Claims priority, application Austria, Mar. 24, 1967, A 2,881/67
Int. Cl. B23c 1/02; B23d 7/08; B24b 41/02
U.S. Cl. 90—14                                             6 Claims

ABSTRACT OF THE DISCLOSURE

A milling and drilling tool with a stationary bench carrying horizontal guides for a slide on a vertical side face. The slide is horizontally displaceable on the guides and a support for a spindle socket is guided in the slide in a vertically displaceable manner, while the spindle socket carrying a horizontal and a vertical spindle is displaceable at right angles to the above-mentioned vertical face. The bench is provided with an attachment or a body portion which extends perpendicularly outwardly from the center of the vertical surface opposite the spindles, so that the bench has a T-shape in top plan; and a clamping table for the workpiece is movably guided on the top of this body portion in the direction of the spindle axis.

BACKGROUND OF THE INVENTION

The advantages of the machine tool of the present invention, and thus, at the same time, the problem solved by this invention, become apparent when examining conventional constructions of milling cutters and drilling tools from the viewpoint of what properties render these machine tools particularly suitable for the milling process, on the one hand, and for drilling operations, on the other hand, and to what extent these properties interfere with one of these machining processes, or with the other, when the tools are to be employed alternately for both operations. In this connection, it is found that the conventional constructions of machine tools for carrying out both operations are especially adapted to respectively perform only one type of machining operation, either the milling or the drilling operation, and, although, making it possible to conduct the other type of operation, do not permit this latter type to be carried out in an optimum manner.

The aforementioned type is represented by a conventional milling cutter, approximately in accordance with French Patent of Addition No. 76,646 to French Pat. No. 1,204,031, wherein the horizontal spindle carrying the cutter executes the advancing movements in all three coordinates with respect to the stationary workpiece. In connection with milling operations, this machine tool affords a very substantial operating range in a direction at right angles to the horizontal spindle; the workpiece is stationary during machining operations; and the stability of the support for the workpiece, as well as the tool feeding facilities in all three coordinates are independent of the weight of the workpiece. For these reasons, the machine tool per se is well suited for accurately positioning the tool with respect to the workpiece, as is required for drilling operations. However, there is the disadvantage that a large portion of the displaceability of the tool in the direction of the spindle is utilized for the tool change and the workpiece controls and thus is lost as a utilizable drilling feed. Therefore, this machine is designed primarily as a milling cutter and performs milling operations to optimum degree, but, although permitting drilling operations, is suitable to drilling operations only to a limited degree.

On the other hand, a conventional drilling tool as disclosed, for example, in German Pat. 921,295, has a clamping worktable capable of executing a "retreat movement" in the direction of the spindle axis, which movement is employed during tool change and during the workpiece control; thus, the displaceability of the tool in the direction of the spindle axis can here be utilized to the full extent of its movement range, without any reduction, as drilling feed. However, in this machine tool, the clamping table, i.e. the workpiece, in addition to the retreat movement in the direction of the spindle axis, is also arranged to incorporate the horizontal feed movement extending at right angles to the retreat movement. Accordingly, the table is constructed in the shape of a cross table, whereas the tool support, in this horizontal direction, is fixedly connected with the bench. This type of construction entails, particularly for milling operations, a large length of the bench, so that the table, in its terminal positions, does not project too far from its guide. For positioning the workpiece, which step is of predominant importance in the drilling operation, a displacement of the workpiece is less favorable than the displacement of the tool in all three coordinates, as is done in the first-mentioned machine tool, due to the gravitational and frictional forces which vary strongly with the different weights of the workpieces.

Furthermore, drilling tools are also known in the art wherein the table executes merely the "return movement," whereas the horizontal spindle is arranged to provide the advancing movements of the tool bit in all three coordinates (French Pat. No. 1,301,204). The horizontal longitudinal guides for the tool support are herein positioned in a horizontal plane. The large space requirement for the machine resulting therefrom turns out to be a grave disadvantage when attempting to construct a drilling and milling cutter of a smaller structural dimension, which is usable for smaller workpieces and is preferable for such workpieces, due to the substantially lower price of such cutter as compared to the known drilling cutters.

SUMMARY OF THE INVENTION

In the combination milling and drilling machine tool of the present invention, the stationary bench, which is of a T-shape in top plan form, in accordance with the invention, has a clamping table for the workpiece guided on the top of the leg portion of the T, previously referred to as the attachment or body portion. This arrangement places the table at a convenient working level, as is customary and suitable, in particular, for smaller workpieces, and makes it possible when installing the machine to anchor the base to the floor merely at three points, whereby cumbersome alignment operations become unnecessary. The clamping table is displaceable in the guides in the direction of the spindle axis. The horizontal longitudinal guide for the horizontal spindle is arranged on a vertical side face of the stationary bench facing the spindle and this results in a small space requirement for the overall machine, thus broadening the possibilities of utilization of the machine. A slide is disposed in the horizontal guide for longitudinal movement and a gear box is connected for vertical guided movement in the slide. The spindle socket is horizontally displaceable on the gear box at right angles to vertical side face of the bench and carries a vertical spindle and a horizontal spindle. In addition to the above, the machine is equally suited for drilling and for milling operations, and thus is usable in an even far more universal manner than the previously conventional universal milling cutters.

In a further development of the invention, an additional or second clamping table is attached to the body portion or leg portion of the T of the bench. This second table is located behind the first clamping table, as viewed from the side of the spindle, that is on the opposite side of the first clamping table from the spindle. This arrangement makes it possible to employ a narrow or a wider table, depending upon the dimensions of the attachments, e.g., rotary attachments with a dividing head mounted thereon. It is likewise possible to clamp workpieces on such a table, the width of which workpiece considerably surpasses the width of the two individual tables. In that case, a wide gap remains between the first and second clamping tables, which gap is covered by the workpiece.

Further features of the invention can be seen from the description of the embodiment illustrated in the drawing, in conjunction with the claims.

DESCRIPTION OF THE PREFERRED EMBODIMENTS

Figure 2:
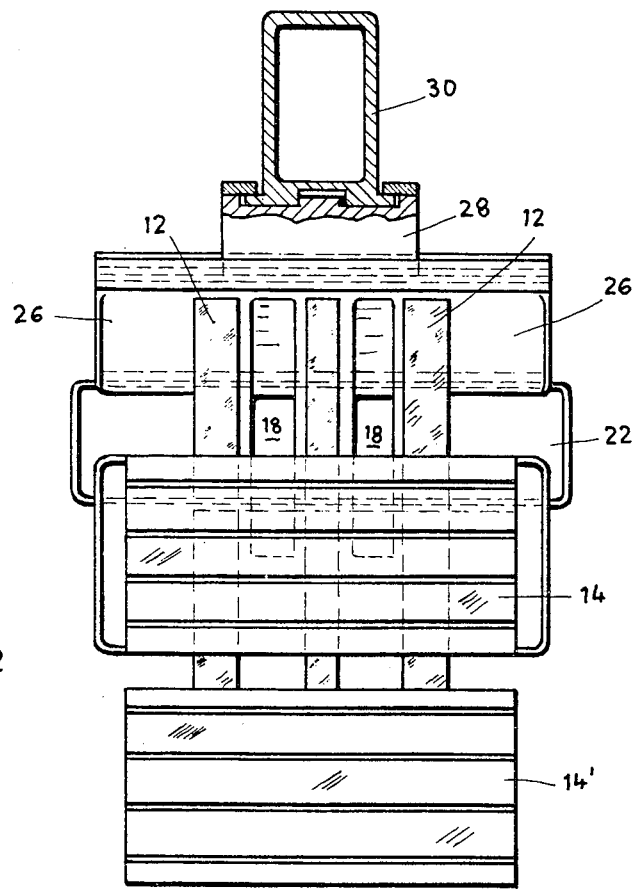
FIG. 2 is a top plan view, partly in section, and taken substantially along line II—II of FIG. 1.
Figure 3:
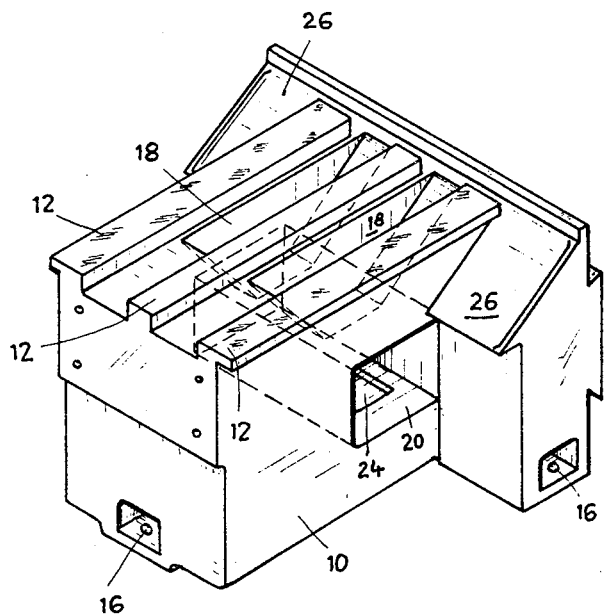
FIG. 3 is a perspective view of the bench of the machine according to FIGS. 1 and 2.

Referring to the drawings in greater detail, raised horizontal guides 12 for a movable clamping table 14 are disposed on the upper surface of the leg portion of the T-shaped bench 10. The bench 10 is adapted to be fastened to the floor by means of the three bolts or screws, indicated at 16. The bench is provided with discharge apertures 18 between the raised guides 12, which apertures extend downwardly into the bench and terminate at the bottom in a recess 20 which extends transversely through the bench. A removable bin or trough 22 is inserted in this recess for catching chips being cut from the workpiece and which are discharged through apertures 18. As illustrated in FIG. 2, the trough 22 is longer than the clamping table 14 and the central portion of its bottom is perforated, not shown, so that the cooling fluid which is discharged into the trough with the chips from the table through apertures 18 can flow off through the opening 24, FIG. 3, in the lower wall of recess 20, downwardly into the interior of the bench 10, from where the fluid is fed to the coolant pump.

The machine tool bench 10 is T-shaped when viewed in top plan and the rear portion of the bench that forms the cross portion of the T is constructed to have an inclined upper surface 26 sloping toward recess 20, so that the chips, etc. are directed into the trough 22 over the inclined surface 26. On the rear vertical side face of the bench 10, horizontal guides 12 for a slide 28 are disposed and a gearbox 30 is connected to slide 28 by means of vertical guides such that it is vertically displaceable on slide 28, which in turn is horizontally displaceable on bench 10. The gearbox carries a spindle socket 32 on the upper surface thereof, which socket is horizontally adjustable relative to the gearbox on horizontal guides disposed at substantially right angles to table 14. A telescopable spindle sleeve carrying the horizontal tool spindle 34 is mounted in spindle socket 32 and is adapted to hold a horizontal tool for preforming machining operations on a workpiece on the table. A further spindle socket 36 with a vertical spindle 38, for example, can be attached to the upper side of the spindle socket 32. This additional spindle socket can be moved rearwardly on the top surface of spindle socket 32 into a rest position, as indicated in dot-dash lines, when the machining operation is to be conducted by means of spindle 34, and spindle 38 is not in use.

Figure 1:
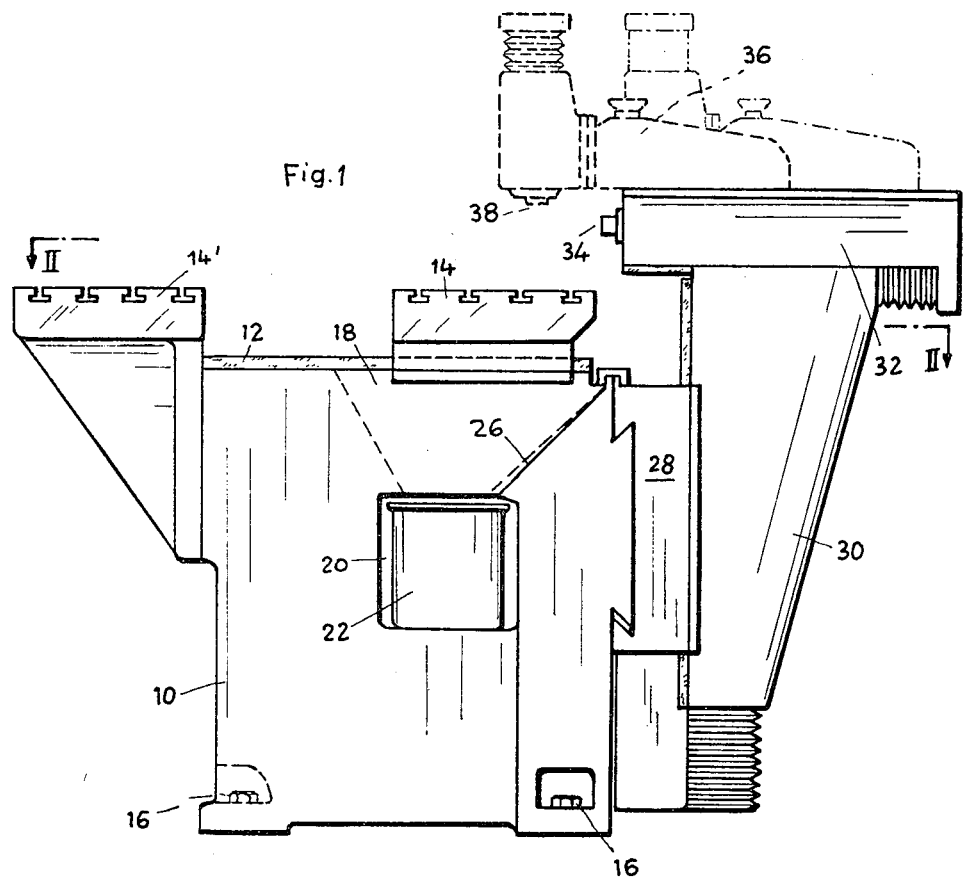
FIG. 1 is an end elevational view of a milling and drilling tool according to the invention.
Figure 4:
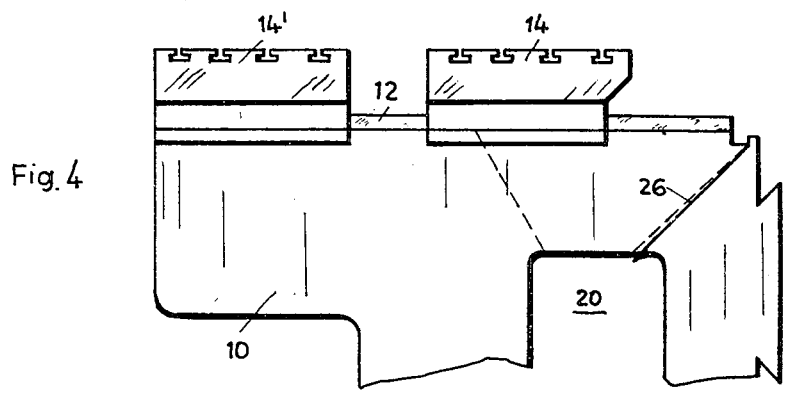
FIG. 4 is an end elevational view of a fragmentary portion of another form of the bench of FIG. 1.

In addition to table 14, which is unusually narrow as compared to the size of the machine, a further table 14' is provided. This latter table can be fixedly attached to the bench, as shown in FIG. 1. However, according to a modified form of the invention shown in FIG. 4, this further table 14' can also be constructed to be displaceable in the same guides 12 on the top of bench 10 in which table 14 is displaceable. In this form of the invention the guides 12 are longer than the comparable guides 12 in FIG. 1. With this arrangement of a pair of work tables 14, 14', in which at least one of the tables 14 is horizontally displaceable in a direction toward and away from the spindle, a workpiece normally too wide for one of the tables can be accommodated by having the workpiece straddle the two tables which are separated by the required amount, then clamped to each of the tables.

The drive gearing, not shown, but well known in the art, is connected to manipulate the tool in all three coordinates. Thus, the feed gears drive the slide 28 horizontally to move the tool spindles 34, 38 longitudinally of work tables 14, 14'; drive the gear box 30 vertically to move the spindles toward and away from the plane of the work tables in vertical planes; and drive the spindle socket 32 and/or the telescopic spindle sleeve with the horizontal spindle 34, horizontally to move the tool spindles 34, 38 laterally of the work tables. The table 14 and, if desired, the table 14', as shown in the modified form, however, can be displaced toward and away from the spindle socket independently of the automatic tool feed controlled by the feed gearing, either manually or by way of a special drive gear, well known in the art. The movable table 14 can be clamped into place on the guide by locking means, not shown. During the machining operation, the tables carrying the workpiece, not shown, on which the machining operation is being performed, are normally stationary and are mainly pushed back during drilling operations when the tool in the spindle 34 or 38 is to be changed or the workpiece is to be checked. It is, of course, to be understood that drilling and milling tool bits can be used in either horizontal spindle 34 or vertical spindle 38.

While the invention has been shown and described in certain preferred embodiments, it is realized that modifications can be made without departing from the spirit of the invention, and it is to be understood that no limitations upon the invention are intended other than those imposed by the scope of the appended claims.

I claim:

1. A milling and drilling tool comprising a stationary machine bench having a vertical longitudinally extending surface portion, horizontal guides on said surface portion, a slide member connected for movement on said horizontal guides, vertical guides on said slide member, support means movably connected on said vertical guides for vertical displacement, a spindle socket, a horizontal tool spindle means mounted in said spindle socket and having an axis at right angles to said vertical surface portion, said spindle socket connected for horizontal displacement on said support means axially of the horizontal tool spindle means, said machine bench having a body portion extending from the center of the vertical surface portion away from the spindle means, said body portion disposed perpendicular to said vertical surface portion whereby said stationary bench is T-shaped in top plan form, horizontal table guides on said body portion, and a clamping table mounted for movement along said table guides in the direction of the axis of said spindle means.

2. A milling and drilling tool as set forth in claim 1, including a second clamping table attached to said body portion of the bench independent of said first-mentioned clamping table, said second table connected to said body portion on the opposite side of said first-mentioned clamping table from said horizontal tool spindle.

3. A milling and drilling tool as set forth in claim 1, in which the longitudinal dimension of said vertical longitudinally extending surface portion is greater than the said dimension of corresponding body portion.

4. A milling and drilling tool as set forth in claim 2, in which said first-mentioned and second clamping tables are in substantially the same horizontal plane.

5. A milling and drilling tool as set forth in claim 1 including chip discharge outlets between said horizontal table guides and extending downwardly into said body portion, said body portion having a transverse passage therethrough beneath said table guides in communication with said chip discharge outlets, and a receptacle removably mounted in said passage beneath said chip discharge outlets.

6. A milling and drilling tool as set forth in claim 2 in which said first-mentioned and said second clamping tables are mounted for independent movement relative to each other on the same horizontal table guides.

References Cited

UNITED STATES PATENTS

| 2,507,437 | 5/1950 | Eserkaln | 90—58 X |
| 3,117,493 | 1/1964 | Zwick et al. | 90—11 |
| 3,316,646 | 5/1967 | Novey et al. | 90—58 X |

FOREIGN PATENTS 960,841   5/1961   Great Britain.

GIL WEIDENFELD, Primary Examiner

U.S. Cl. X.R.

51—166; 90—11, 58